Aug. 16, 1932.  F. J. REED  1,872,340
BUSHING CLAMP
Filed Jan. 11, 1930

INVENTOR
Frederick J. Reed.
BY
ATTORNEY

Patented Aug. 16, 1932

1,872,340

UNITED STATES PATENT OFFICE

FREDERICK J. REED, OF SHARON, PENNSYLVANIA, ASSIGNOR TO WESTINGHOUSE ELECTRIC & MANUFACTURING COMPANY, A CORPORATION OF PENNSYLVANIA

BUSHING CLAMP

Application filed January 11, 1930. Serial No. 420,186.

My invention relates to bushing clamps and particularly to clamps for securing the terminal bushings of oil-filled transformer tanks in position.

One object of my invention is to provide a clamp, of the above-indicated character, that shall render the bushing fluid-tight relative to the tank wall or other support.

Another object of my invention is to provide a bushing clamp that shall permit the ready installation, removal and replacement of a bushing.

Another object of my invention is to provide a bushing clamp, or equivalent structure, that shall perform a plurality of functions and include parts that shall move relative to the tank and bushing, in a plurality of directions, in response to an operating or assembly movement in one direction.

Another object of my invention is to provide a bushing clamp or securing means that shall render unnecessary the practice, in connection with oil-immersed transformers, of permanently sealing the bushings to the tank walls.

Another object of my invention is to provide a clamp that shall be adapted to so secure a bushing of an existing type, heretofore permanently secured, that the bushing may be removably clamped or permanently secured at will or as circumstances require.

A further object of my invention is to provide a bushing clamp or equivalent structure that shall be simple and durable in construction, economical to manufacture and effective in its operation.

Heretofore, it has been usual, in connection with oil-immersed transformers of certain types, to permanently seal the terminal bushings to the transformer tanks, walls, potheads or pockets through which the bushings extend. This has been accomplished, in certain structures, by the provision of grooves in the bushings and bodies of Babbitt metal or other sealing medium which adheres to the adjacent parts to be sealed. A seal of this type is not fluid tight.

When such seal or bushing becomes damaged in the field, it is necessary to replace the entire unit, thus causing relatively great inconvenience and undue interruption of service.

It is my aim to overcome all of the difficulties above mentioned and, accordingly, in practicing my invention, I provide a clamp that renders the seal between the bushing and the wall fluid-tight and is substantially as economical as a permanent seal, is easy to manipulate, facilitates the installation and replacement of the bushing and is, in general, an improvement over the prior practice.

Figure 1 of the accompanying drawing is a side view, partially in elevation and partially in section, of a structure embodying my invention;

Figure 1:
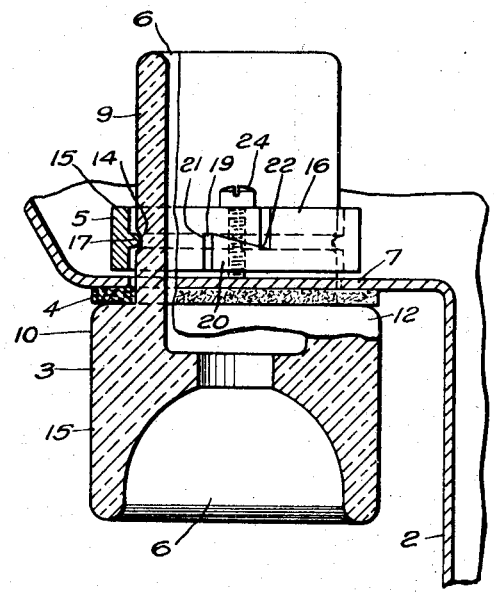
Figure 2:
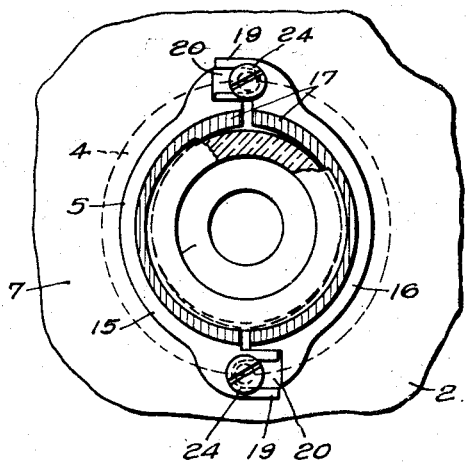
Fig. 2 is a top plan view, partially in section, of the structure shown in Fig. 1.

Referring to Figs. 1 and 2, the device comprises, in general, a tank or casing 2, a bushing 3, a yieldable sealing gasket 4 and a clamp 5 of my invention.

The casing 2, only a portion of which is shown, is for enclosing a transformer or other apparatus (not shown) and includes an apertured wall portion 7 through which the bushing 3 extends. The bushing has an inner opening 6 through which a conducting lead extends from the transformer to an exterior circuit, in a usual manner. The casing is preferably of relatively thin sheet metal for this application, although this feature is not essential to the invention, and the casing may be of greater or less wall thickness and of other materials, either conducting or insulating.

The transformer, or other translating device for enclosure by the casing, is of a type which may be, and usually is, immersed in a fluid, such as an oil or a gas, although it may be for operation in a vacuum, since the particular feature of the invention relates to a clamp for a fluid-sealed bushing.

The bushing 3, for the present purposes of the invention, is preferably of dielectric material, such as porcelain, and comprises portions 9 and 10 of different outside diameters to provide a shoulder 12 on which the gasket 4 rests. An annular groove 14 is provided in the outer surface of the portion 9.

The gasket 4, of yieldable material, such as cork, is preferably in the form of a flat-plane washer having inner and outer circular contours closely conforming to the cylindrical outer contours of the portions 9 and 10, respectively, and surrounds the bushing between the shoulder 12 and the wall 7 adjacent to the circular opening in the latter.

Figure 3:
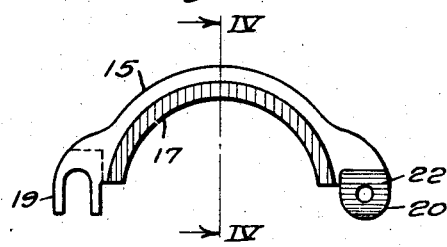
Fig. 3 is a top plan detail view of one of the clamp elements.
Figure 4:
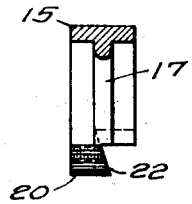
Fig. 4 is a sectional view taken along the line IV—IV of Fig. 3.
Figure 5:
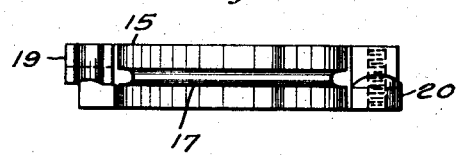
Fig. 5 is an inside elevational view of the element of Fig. 3.

The clamp 5, which is preferably disposed entirely inside the casing 2 to prevent manipulation thereof by unauthorized persons, comprises duplicate half portions 15 and 16 each comprising, as shown more clearly in Figs. 3, 4 and 5, an inner arcuate or semi-circular holding portion or bead 17 of slightly greater radius than the radius of the inner surface of the groove 14, a bifurcated end 19 and an interiorly-screw-threaded end 20. The ends 19 and 20 have surfaces 21 and 22, respectively, sloping relative to the plane of the ring formed by the semi-annular portions 15 and 16. Screws 24 are provided for the ends 20.

In assembling the structure, the gasket 4 is placed over the portion 9, and the bushing 3 is placed in the opening in the wall 7 in the positions illustrated in Fig. 1. The semi-annular portions 15 and 16 are then placed about the bushing 3, either with or without the screws 24 advanced partially in position, in which each screw is embraced by the bifurcated end 19 on the other semi-annular portion.

When the screws 24 are advanced through the ends 20 normal to the wall 7, simultaneous different movements of certain of the parts occur. The screwing movement causes the ring to move, as a whole, away from the wall 7 and causes the portions 15 and 16 to move inwardly toward each other by reason of the relation of the sloping surfaces 21 and 22.

This compound or simultaneous movement advances the holding portions 17 into the groove 14, thereby causing the clamp to assume a positive and secure relation to the bushing, and inwardly advances the bushing longitudinally to compress the gasket 4 against the wall 7. The heads on the screws 24 are not necessary, as the pressure of the bead 17 on the grooved portion 14 of the bushing 3 provides the force to cause the above movements.

The device is extremely simple, neat, compact and economical, facilitates the assembly, disassembly and replacement of the bushing, provides an effective fluid-tight seal, eliminates the disadvantages of permanent seals and is a general advancement in the art to which it relates.

While I have shown and described a particular form of my invention, changes may be effected therein without departing from the spirit and scope thereof, as set forth in the appended claims.

I claim as my invention:

1. In combination in electrical apparatus, a casing for enclosing a fluid-immersed translating device, a dielectric bushing having an outer annular shoulder and an outer annular groove and disposed in an opening in a wall of the casing, a yieldable gasket surrounding the bushing between the casing and the shoulder at one side of said wall, said groove being at the opposite side of said wall, and a clamp at said opposite side comprising a ring including perimetral sections each embodying an inner flange for location in said groove and end portions having surfaces sloping relative to said wall, one of said end portions having an opening for receiving a screw normal to said wall and the other end portion being bifurcated for lateral embracement of the screw in a next adjacent section, and screws in said receiving openings, the clamp operating, when the screws are advanced relative to the wall and by the cooperation of said sloping surfaces, to force said flanges laterally inward in said groove and to force the bushing longitudinally relative to the wall to compress said gasket.

2. In combination, a wall member having an opening therethrough, a bushing extending through said opening having a shoulder of greater diameter than said opening at one side of the wall and a lateral shoulder of smaller diameter than said opening at the other side of the wall, and clamping means cooperating with said second shoulder at said other side of the wall comprising a ring divided into perimetral sections and including an inner projection for gripping the bushing and cooperating sloping surfaces, and screws disposed entirely at said other side extending through said sections operating, when forced against the wall, to move the ring axially away from the wall and the sections laterally inwardly.

3. In combination, a wall member having an opening therethrough, a bushing extending through said opening having a shoulder of greater diameter than said opening at one side of the wall and a lateral shoulder of smaller diameter than said opening at the other side of the wall, and clamping means cooperating with said second shoulder at said other side of the wall comprising a halved ring including an inner projection for gripping the bushing, the halves each having a screw-threaded end and a bifurcated end for cooperation with the screw-threaded end of the other, each end of each half having a sloping surface cooperating with a sloping surface of the other, and screws in said screw-threaded ends for position in said bifurcated ends and operating, when forced against the wall, to move the ring axially away from the wall and the halves laterally inwardly.

In testimony whereof, I have hereunto subscribed my name this thirty-first day of December, 1929.

FREDERICK J. REED.